Sept. 4, 1956

J. H. OWENS 2,761,970

LOW FREQUENCY WAVE GENERATORS

Filed June 11, 1953

3 Sheets-Sheet 1

INVENTOR.
JAMES H. OWENS

BY Charles K. Brown

ATTORNEY

INVENTOR.
JAMES H. OWENS

BY Charles H. Brown
ATTORNEY

LOW FREQUENCY WAVE GENERATORS

Filed June 11, 1953 3 Sheets-Sheet 3

INVENTOR.
JAMES H. OWENS
BY Charles H. Brown
ATTORNEY

United States Patent Office 2,761,970

Patented Sept. 4, 1956

2,761,970

LOW FREQUENCY WAVE GENERATORS

James Herbert Owens, Merchantville, N. J., assignor to Radio Corporation of America, a corporation of Delaware Application June 11, 1953, Serial No. 360,969

18 Claims. (Cl. 250—36)

This invention relates to oscillation generating circuits and particularly to such arrangements wherein the frequency is determined by means of networks comprising non-inductive resistors and capacitors.

Circuit arrangements of the type mentioned have been found useful principally for generating oscillations over a wide continuous range of frequencies although the circuit arrangements are also used to a limited extent as discrete frequency oscillation generators. The prior art oscillation generators of the type mentioned have not been entirely satisfactory for several reasons. The output amplitude of such generators tends to vary widely with powerline voltage fluctuations and over the tuning ranges which are desirable in practice and the known arrangements for limiting this amplitude variation are either too expensive or inadequate to meet the required standards.

The known circuit arrangements for controlling the frequency of oscillation, which are based on the well-known Wien bridge, twin-T and other resistance-capacitance (RC) bridge circuit arrangements, have the disadvantage that only one part of the circuit may be at ground potential. For example, these circuits usually require that the rotors and frame of conventionally built variable condensers be "floated" above ground. This disadvantage manifests itself in several ways. First, there is the necessity for providing insulation between various parts of the frequency determining circuit. This, in turn, requires additional space. It has been found that porcelain or similar fragile insulators are practically the only type suitable for this purpose. Because of their fragile nature, these insulators break frequently. This is expensive both in the cost of replacement and the loss of time in which the oscillator might have been put to useful service. Also, dust and moisture tend to collect on these insulators (which are located in extremely high resistance circuits) establishing paths to ground of sufficiently low resistance to impair the operation of the oscillator. Furthermore, the general design of such circuits aggravates the tendency to pick up hum.

In the past, amplitude variations have been compensated for in RC oscillators of the type described almost invariably by means of at least one impedance element in a negative feedback path wherein the impedance increases as the current flowing through the element increases. One such resistive impedance element in common use is the tungsten filament lamp. Unfortunately, the conventional impedance elements of the type described do not provide an immediate change in reactance for the change in signal current. In the tungsten filament lamp for instance, there is a time delay in the desired action referred to as a temperature-time delay.

The known RC oscillators almost invariably employ either 4-gang variable capacitors or 4-gang variable resistors as the tuning elements. In at least one commercially available instrument, a 16-gang variable capacitor is used. The commonly available variable resistors and variable capacitors are not always entirely suitable for the purpose. Arrangements are known for overcoming these problems, but these expedients are somewhat expensive and therefore undesirable.

An object of the invention is to generate low frequency oscillations over a wide frequency range with more constant output amplitude than heretofore obtained in the art even with relatively wide variation of power supply voltage.

Another object of the invention is to provide an improved and simplified variable frequency oscillator circuit arrangement having substantially constant amplitude output without any objectionable lag.

A further object of the invention is to provide an oscillation generator having lower harmonic distortion than presently available at equivalent cost.

Another object is to provide an improved oscillator circuit arrangement in which the common "rotor and frame" terminal of each of the tunning devices may be at a desired common potential, preferably ground.

A further object of the invention is to make use of a non-linear resistance element in such an oscillator circuit arrangement wherein the resistance decreases with an increase of current flow therethrough.

Still another object is to make use of a space-charge-element diode in such a circuit arrangement as a means of maintaining more uniform output over a wider range of power supply voltage variations than previously known to the art.

A still further object of the invention is to eliminate the need for specially designed variable capacitors or unconventional and costly mounting of conventional variable capacitors in RC audio oscillators.

The objects of the invention are obtained by means of a circuit arrangement comprising a pair of controlled electron flow path devices regeneratively intercoupled by similar low-pass filter networks coupled into the circuit so that one terminal of each variable capacitor employed may be at a given fixed reference potential, preferably ground. The low-pass filter in the feedback circuit, being the same as the low-pass filter in the interstage circuit, is effective as a high-pass filter and tracks perfectly with the other filter.

The oscillator according to the invention consists of a twin high vacuum tube cathode-coupled regenerative circuit in which one tube operates as a grounded-grid or "cathode-driven" amplifier and the other tube as a paraphase amplifier. The control-grid of the paraphase amplifier is driven from the anode of the grounded-grid amplifier through a low-pass RC network, and the grounded-grid amplifier is cathode-driven from the cathode of the paraphase, the control-grid of the grounded-grid amplifier being fed the same signal but prevented from following the signal on the cathode by means of the other low-pass RC network. Variations of the basic embodiment incorporate positive feedback means to provide substantially constant output over the tuning range, means to eliminate the effects of power line variation, and means to reduce the harmonic content of the output wave.

In order that the invention may be more clearly understood and readily put to practical use, a number of circuit arrangements embodying the invention are hereinafter described, by way of example only, with reference to the accompanying drawing in which.

Figure 1:
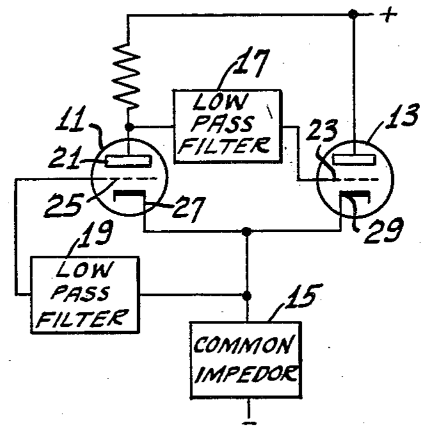
Fig. 1 is a functional diagram of an oscillation generating circuit according to the invention.

Referring to Fig. 1, there is shown a functional diagram of an oscillator circuit according to the invention. A pair of controlled electron flow path systems such as are provided by a pair of transistors, controlled semi-conductors, or high vacuum triodes 11 and 13 as shown, or other electron discharge devices are intercoupled by two low-pass filters 17 and 19 and connected to a common cathode impedance element 15. One triode 11 is operated as a grounded-grid or "cathode-driven" amplifier and the other triode 13 is connected as a cathode follower to feed back energy properly phased to the amplifier triode 11 and to deliver an output wave. The cathode follower triode 13 is driven by means of low-pass filter 17 coupling the anode 21 of the grounded-grid amplifier 11 to the grid 23 of the cathode follower 13. The signal developed across the cathode impedor 15 is fed directly to the cathode of the grounded-grid amplifier but is phase-delayed from the grid 25 of the amplifier triode 11 by the low-pass filter 19.

The signal on the cathode follower grid 23 lags behind that at the amplifier anode 21. Likewise, the signal on the grid 25 after passing through the low-pass filter 19, between the cathode 27 and the grid 25 of the amplifier tube 11, lags behind that at the cathode 27, or conversely, the signal at the cathode 27, in effect leads that on the grid 25. Because of this connection, the low-pass pass filter 19 affects the overall circuit as a high-pass filter would if connected in the anode-grid circuit of a conventional "grounded cathode" type two-stage feedback amplifier circuit, such as is employed in oscillators based on the Wien bridge and similar circuits. A considerable advantage is gained in the circuit as shown because it is well-known that two similar type filters can be made to track over an extended frequency range much easier than two corresponding dissimilar filters.

Figure 2:
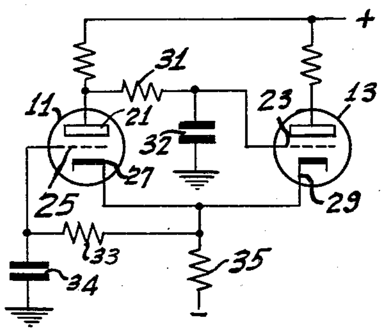
Fig. 2 is a schematic diagram of the basic oscillation generating circuit, according to the invention, based on the functional arrangement of Fig. 1.

The basic circuit, as shown in Fig. 2, neglects the D. C. paths necessary for proper grid bias. The triodes 11 and 13 are connected as shown in Fig. 1. The low-pass filters 17 and 19 of Fig. 2 are constituted by the resistor-capacitor combinations 31—32 and 33—34, respectively. A resistor 35 serves as the common cathode impedor for the two tubes 11 and 13. The simplicity of the low-pass filter required for the circuit arrangement of the invention is evident; as is the feature of being able to place one terminal of each of the capacitors 32 and 34 at ground or other desired point of fixed reference potential. The signal voltage on the anode of the amplifier triode 11 is transferred by the resistor 31 to the grid of a repeater vacuum tube 13 which may be a cathode follower as shown in Fig. 1 but preferably is a paraphrase amplifier 13 as shown in Fig. 2 for reasons later to be given. Because of the by-passing at high frequencies, and the phase-shifting action of the capacitor 32, the circuit has a rising low-frequency characteristic.

The signal voltage on the cathodes 27 and 29 of the tubes 11 and 13 is transferred to the grid 25 of the amplifier tube 11 by way of the resistor 33. Low frequencies are not by-passed by the capacitor 34 and therefore there is very little voltage difference developed between the grid and cathode of the grounded grid amplifier tube 11 at low frequencies. High frequencies are by-passed and shifted in phase, by the capacitor 34, and a voltage difference is produced between the cathode and grid which has a rising high frequency characteristic. At one discrete frequency, the phase-shifting effect of the resistor-capacitor combination 31—32 is equal, but opposite to the phase shifting effect of the combination 33—34. At this frequency, the overall gain of the circuit is maximum and oscillations are generated.

Figure 3:
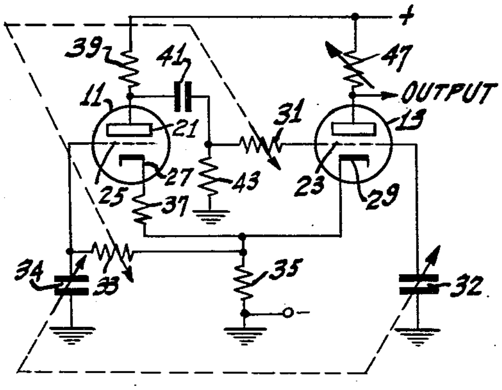
Fig. 3 is a schematic diagram diagram of a practical embodiment of the arrangement shown in Fig. 2.

The circuit arrangement shown in Fig. 3 is substantially the same as that of Fig. 2 except that a D. C. blocking capacitor 41, of relatively high capacity, and grid return resistor 43, of relatively high value, have been provided for the proper application of D. C. operating potentials. The filter resistors 31 and 33 and capacitors 32 and 34 are preferably of equal values respectively, in which case the frequency $$f=\frac{1}{2\pi RC}$$

The output signal can be obtained from either tube at any point of desired impedance level. Preferably, however, the output is taken from the anode of the paraphase amplifier tube 13 across resistor 47 as shown in Fig. 3. This provides less distortion than would be obtained if the output were taken from the amplifier tube 11 since the grid of tube 13 is fed through the low-pass filter comprising the resistor 31 and the capacitor 32, which attenuates harmonics. The value of the resistor 47 will enter into both the grid-voltage-swing requirements and the output voltage delivered at the cathode of the tube 13.

The oscillator shown in Fig. 3 may be tuned over a band of frequencies by simultaneous adjustment of either the filter resistors 31, 33 or the filter capacitors 32, 34, or both. A convenient and very practical arrangement is to switch the resistance values in discrete steps and to use a ganged variable capacitor having grounded rotors and frame to tune over each range. A 10:1 frequency range in each band is readily obtainable with commercially available parts, whereby the tuning dial can be calibrated for decimal multiplier factors which will tend to reduce confusion and otherwise make for convenience in operation.

A few basic considerations of the circuit arrangement according to the invention are in order. It is well understood that a tube of almost any given type can develop enough undistorted voltage at the anode to overdrive, or overload, the grid of a tube of similar type coupled to it. Hence, the grounded-grid amplifier tube has a tendency to overdrive the paraphase amplifier. The undesirable condition is overcome in two ways, viz., (1) the load resistor of the grounded-grid amplifier tube is kept small, and (2) the paraphase amplifier tube is chosen for low mu so that it requires a relatively large amount of grid swing. Carrying this reasoning further, it will also be seen that the cathode output voltage of the paraphase amplifier will tend to under-drive the grid of the grounded-grid amplifier tube. There are four reasons for this: (*a*) less voltage is developed at the cathode of the paraphase amplifier 13 than appears at the grid, (*b*) the grounded-grid amplifier circuit absorbs power from the driver 13, (*c*) there is a considerable amount of loss in the bias resistor 37, and (*d*) the anode of the paraphase amplifier 13 is not by-passed to ground so the output is limited. For good sine wave output, the excursions of the grid voltages applied to both tubes should extend over corresponding slopes of the grid voltage-anode current characteristic curves for the respective tubes. In other words, the ratio of applied signal voltage to applied grid bias should be substantially the same for both tubes. Taking full cognizance of all these factors, it is readily apparent that the grounded-grid amplifier should have high mu ($\mu$) and the paraphase amplifier should have low mu for best results. But tubes of ideally matched characteristics are not always available, so it is advantageous to provide a means for matching the characteristics of average production tubes. This can be done by varying the power input, and hence the power output of either or both tubes. As shown, the amplifier anode load resistor 39 is a low value so that the amplifier output will be insufficient to fully drive the paraphase amplifier. Then the paraphase amplifier anode load resistor 47 is made variable so that the power input to the paraphase amplifier can be controlled. By proper adjustment of the resistor 47, the grid drive requirements of the paraphase amplifier are reduced, and its cathode output is reduced to the point where both tubes are equally driven or "matched."

Figure 4:
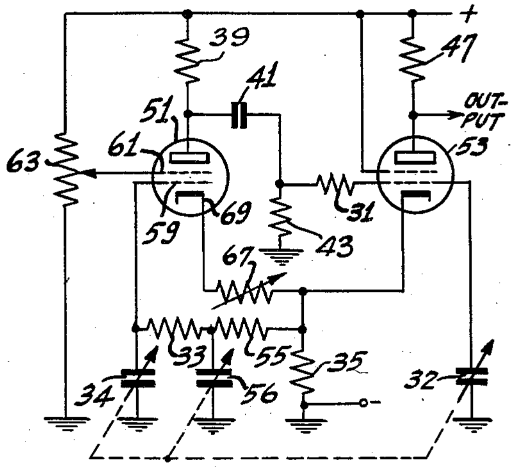
Fig. 4 is another embodiment of the basic oscillator incorporating additional frequency selective networks and adjustable means for controlling the degree of regeneration.

Several refinements of the arrangement of Fig. 3 are shown in Fig. 4, wherein a pair of tetrodes 51 and 53 are used for the grounded-grid amplifier and the feedback paraphase amplifier respectively. The control-grid shielding of the tetrode eliminates anode-to-grid coupling and enables more uniform output to be obtained over the wide frequency bands that are desired in practice. According to the invention, the output of either or both the grounded-grid and the paraphase amplifier tubes may be controlled by varying the anode supply potential, the anode load impedance value or, if either tube is a tetrode or a pentode, the operating potential supplied to a screen or a suppressor grid.

It has been found desirable to operate both tubes biased further than would be the case for class A operation. In fact the circuit appears to operate best when the tubes are driven close to cutoff on the negative swing of the output excursion. In this way the tubes are operated on the curve of the tube characteristic rather than the straight portion as would be if class A operation were established. This works on the principle that when a triangular wave is fed through a two-stage cascaded amplifier in which both tubes are operated on the bend of their grid-voltage plate current curves, a fairly pure sine wave results. This type of operation actually makes it somewhat easier to obtain a sine wave output.

An additional filter section constituted by a resistor 55 and a capacitor 56 are interposed in the connection between the common cathode resistor 35 and the grid 59 of the grounded-grid amplifier tube 51. The capacitor 56 is formed by one section of a three-gang variable capacitor of which the rotor and frame are again at ground potential; no special construction being necessary. The additional phase shift thus obtained tends to steepen the cutoff curve of the filter characteristic and has substantially the same effect as using a higher $\mu$ tube as the grounded-grid amplifier or a paraphase amplifier having a lower screen-to-grid $\mu$ factor. It results in a better "match" than is currently possible with commercially available tube types having otherwise satisfactory characteristics. If desired, an additional filter section of similar configuration can be interposed betweeen the driven amplifier anode and the grid of the paraphase amplifier, but this has been found desirable only under very exacting circumstances.

The screen grid 61 of the amplifier tube 51 is connected to the arm of a potentiometer 63 across the anode potential supply in order to adjust the output of the tube 51. The adjustment of the potentiometer 63 is helpful in reducing harmonic distortion. A variable resistor 67 is interposed in the lead to the cathode 69 of the amplifier tube 51 to control the degree of feedback. By proper adjustment of the regeneration-control potentiometer 63 a sine wave output is available across the anode resistor 47.

The primary difficulty with the two-tube sine wave oscillators of the prior art is in obtaining distortion-free output over the entire range of the instruments. As the regeneration control is advanced, sine wave oscillations may be generated at a given frequency, but as the control is advanced a little farther harmonic distortion will enter because the tubes overdrive each other. In the past a tungsten filament lamp, having a steep positive resistance-current characteristic has been successfully employed in the negative feedback circuit of a conventional amplifier tube in the oscillator circuit to reduce the amplification and limit the distortion. In the arrangement shown in Fig. 5 tungsten filament lamp 71 is interposed in the positive feedback path between the driving cathode 65 of the paraphase amplifier tube 53 and the driven cathode 69 of the grounded-grid amplifier 51. It will be readily understood that as the cathode output of the paraphase amplifier is increased more voltage will appear across the lamp, its resistance will increase, and the regeneration will be decreased. A capacitor 73 across the lamp 71 is shown for high frequency emphasis but may be omitted in many cases.

A variable resistor 77 is used in the anode circuit of the paraphase amplifier tube 53 to provide a control of the distortion in the output wave. Regeneration is controlled by adjustment of a tap 79 on the common cathode resistor 75 which varies the bias on the grid 59 of the grounded-grid amplifier tube 51.

Figure 5:
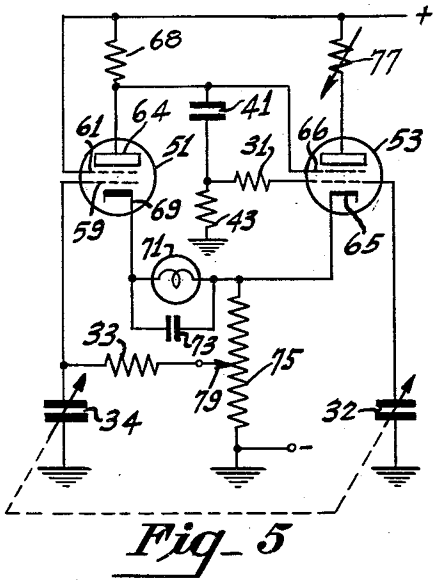
Fig. 5 is an alternate embodiment of an oscillation generator according to the invention.

An additional refinement is shown in Fig. 5 which is applicable, however, to other embodiments as well in order to stabilize the oscillator against drift due to power line voltage variations and for the drift in the characteristics of the tubes which occurs as the tubes age. The anode 64 of the grounded-grid amplifier tube 51 is connected directly to the screen grid 66 of the paraphase amplifier tube 53. The change in screen current in the paraphase amplifier tube 53 due to variations in the filament and cathode temperature and emission of the cathode 65 is introduced into the anode resistor 68 of the tube 51 and serves to flatten the response curve of the circuit over a wider frequency range by changing the effective load into which the grounded-grid amplifier tube 51 works.

Figure 6:
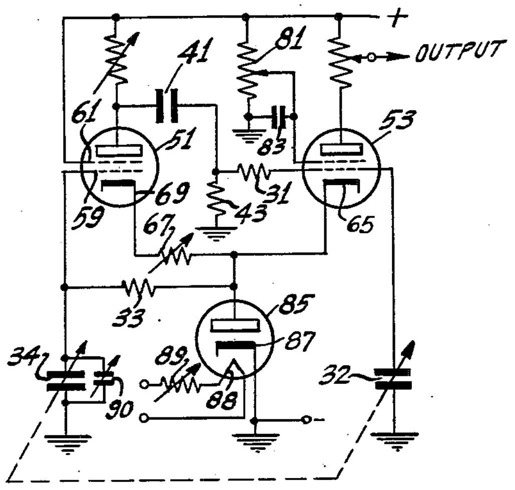
Fig. 6 is a further embodiment of the invention incorporating supply voltage stabilizing circuitry.

A circuit arrangement according to the invention and having additional control of distortion and feedback is shown in Fig. 6. A variable resistor 81 is connected in series with the screen grid of the paraphase amplifier tube 53 and is also by-passed by a capacitor 83 for the lowest audio frequency to be generated. The dropping resistor 81 is used to lower the screen voltage of the tube 53 and thus sharpen the cutoff characteristic. This is a means of securing the best possible balance between the two oscillator tubes 51 and 53 which should have different cutoff characteristics for best results. It is worth mentioning that tubes of identical characteristics can be used with good results in this circuit if electrode voltages are adjusted so that the cutoff of the grounded-grid amplifier 51 will be sharper than the cutoff of the paraphase amplifier 53, in the correct proportion. Tetrodes or pentodes are preferred over triodes for the oscillator tubes because of the reduced "Miller effect," which effect can be troublesome in this arrangement, as in most RC oscillators, because the control grids are operated at high impedance levels above ground.

Starting with the grounded-grid amplifier 51, the train of events starting when the D. C. power supply is connected to the circuit will be considered for the arrangement of Fig. 6 in greater detail than for the previous circuits although the operation is substantially the same in all cases. The anode of the driven amplifier 51 rises to a positive value, and this rising voltage is transferred to the grid network of the paraphase amplifier 53 through capacitor 41. The grid network comprising the resistor 31 and the capacitor 32 shifts the phase of the voltage and reduces its amplitude; nevertheless some of it reaches the control grid of the paraphase amplifier 53 as a positive or rising voltage.

With the control grid now going positive, the paraphase amplifier 53 draws more current, which in turn produces a greater voltage drop across the common cathode impedor which is in the form of a diode 85 in this arrangement. This makes the cathodes of both tubes 51 and 53 more positive. Because it is connected through a resistor 67 to the cathode 69 of the grounded-grid amplifier tube 51, the cathode 69 also goes more positive. If the grid 59 of the driven amplifier 51 were grounded, this would have the same effect as making the grid 59 more negative. However, the grid 59 is not grounded, but is driven from the cathode 87 of the paraphase amplifier 53 through the phase-shifting network, comprising the resistor 33 and the capacitor 34. This network amounts to a "partial" ground, so actually there is only a small negative increase in bias produced, but this causes a reduction in the current flowing through the driven amplifier tube 51, and a corresponding increase in voltage at the anode of the tube 51. This is in the same phase direction as the original condition which started the train of events, therefore the circuit oscillates.

As before, the period of oscillation is a function of the phase-shifting networks which in configuration are "low-pass" filters of circuit types known to the art.

Referring to the first filter comprising the resistor 31 and the capacitor 32, it will be readily understood that the attenuation of this network will decrease with a decrease in frequency. The resistor 31 presents a constant impedance value, but the capacitor 32 presents a shunt impedance which rises as the frequency is lowered. In other words, the gain of the paraphase amplifier 53, will have a rising low-frequency characteristic and a drooping high-frequency characteristic.

On the other hand, the amplifier tube 51 has a drooping low-frequency characteristic and a rising high-frequency characteristic. The reason is that the paraphase amplifier 53 tends to drive both the grid and cathode of the driven amplifier tube 51 in the same direction, which would cause no change in plate current were it not for the frequency selective action of the filter section. The higher the frequency, the lower is the shunt impedance of the capacitor 34, and the greater is the difference in driving voltage between grid 59 and the cathode 69. The overall effect is that the circuit will oscillate at a frequency where the phase shift produced by one filter cancels the phase shift produced by the other. Furthermore, because the circuit is frequency selective, harmonics will be held to a low level, and a good sine wave will be generated.

Like the other circuits, the phase-shifting networks of this one have a decided effect on the tendency to oscillate, as well as on the frequency of oscillation. For instance, an increase of the capacitance of the capacitor 34 or an increase of the resistance of the resistor 33 will increase the regeneration, or vice-versa. Likewise, an increase if the capacitance of the capacitor 32 or an increase of the resistance of the resistor 31 will decrease the regeneration, or vice-versa. In practice, this phenomenon may indicate the use of slightly different value resistors and capacitors in the two networks to obtain the desired end-result in a specially designed instrument.

There are several controls required for proper operation of the circuit, and each one of them may be realized by a low cost potentiometer or rheostat. The points of control are regeneration, harmonic reduction—which results from proper tube balance, and stability as referred to line voltage variations, tube aging, and improper tracking of the tuning condensers.

The most sensitive voltage having an effect on regeneration is grid bias of the driven amplifier tube 51. Therefore, the cathode-bias resistor 67 has been made variable as was done in the arrangement of Fig. 4. This is the regeneration control, and in practice may be a factory adjustment. A decrease in the grid bias applied to the grounded-grid amplifier tube 51 increases the gm of the tube, and this increases the regeneration and the strength of oscillation. Proper adjustment of resistor 67 is a compromise between highest oscillation amplitude and allowable harmonic distortion. Distortion increases with the amplitude of oscillation, but too little regeneration aggravates the tendency toward non-uniform output over each range and between ranges.

A favorable point having an effect on stability with circuit illustrated by Fig. 6 is the cathode load on the paraphase amplifier 53, therefore the diode 85 is used as a 3/2 law variable cathode-load resistor. The tube 85 is an ordinary electron-tube diode, operated under the condition where its anode-to-cathode resistance is space-charge-limited. This condition may be obtained in a practical manner by controlling the temperature of the heater by a series rheostat 89. When the heater temperature is correct for nominal line voltage, the oscillator is stable and has uniform output almost independent of line voltage fluctuations. Taking into account the fact that an increase in cathode-load-resistance of the paraphase amplifier 53 causes an increase in cathode output, a drop in line voltage which would otherwise tend to decrease overall regeneration and signal output should be considered. The drop in line voltage causes a drop in the heater voltage of the diode 85 and a corresponding increase in the plate-to-cathode resistance of the diode 85. The result is an increase in regeneration which counteracts the effect of other voltages which were reduced by the drop in line voltage. If the line voltage increases, the opposite conditions are generated but compensated for in the same manner but in the reverse direction. The rheostat 89 is the line-voltage-stabilizer, and may be adjusted at the factory in assembly line production. It is possible to eliminate the rheostat by the proper choice of diode. In one model, a type 6AQ6, duplex diode-triode was used with good results. The grid and plate and one of the diodes in a tube having "average" characteristics were tied otgether. The so-called "limit" tubes can then be made to work properly by either disconnecting the one diode in use, or by connecting the both diodes into the circuit as "trimmer" electrodes.

There is still another important function performed by the diode 85, that is, as a "limiting" element. In general, all RC type audio sine wave generators require at least one circuit component that "flattens" oscillation peaks. It is the purpose of the limiting element to introduce losses which prevent full or maximum swing of grid and/or anode voltages, and thus prevent or reduce the distortion that results from too much regeneration.

In the past, use has almost invariably been made of a resistor whose resistance increases as the current through it increases, which in turn causes an excess increase in voltage across it. Such an element has been used in the past in a place where the increase in resistance would cause an increase in degeneration. In the circuit shown, an element of this type can be used in the positive feedback path as shown in Fig. 5.

A better end-result for certain application can be obtained by making proper use of an element whose resistance decreases as the current through it or the voltage across it, increases. However, this type of element must be used in a place where the decrease in resisatnce will cause a decrease in regeneration. In the circuits shown, this element can be used as the anode load for the amplifier tube or as the cathode bias resistor for the cathode follower tube. A "thyrite" resistor performed satisfactorily as the amplifier anode resistor, but was discarded in favor of a tube diode as the cathode follower load because of the additional advantages offered by the diode in stabilizing the oscillator at different line voltages. Naturally, it is possible to make use of both the tube diode and thyrite resistor simultaneously. The superiority of this type of resistive element lies in the availability of resistors whose change in resistance is instantaneous with the A. C. Signal, that is, there is no "temperature-time delay" as there is in a tungsten filament lamp.

A trimmer capacitor 90 is shunted across the tuning capacitor 34 to provide correct tracking over the entire range. Only one trimmer is required to hold the output constant at the high frequency end of each range, although additional trimmers might be used to obtain extra close dial calibration. In some instances better tracking and more uniform output can be obtained by making the capacitor 34 larger than the capacitor 32. This was accomplished experimentally by removing plates from the latter (and also by using a superheterodyne receiver type tuning condenser) thus reducing its average, and also minimum and maximum capacitance. In effect, this is related to the earlier statement that the amplifier tube 51 should have higher gm or screen-to-grid mu than the cathode follower tube 53. To appreciate these factors, consideration must be given to the normal parameters of any Class A amplifier.

Figure 7:
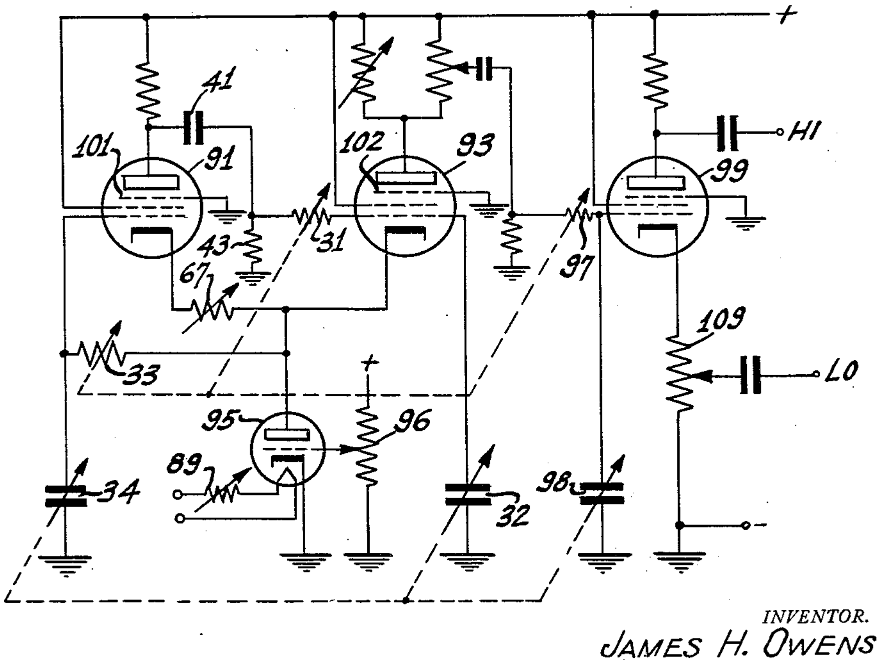
Fig. 7 is still another embodiment of the invention incorporating means for further reducing harmonic distortion in the output signal.

A circuit arrangement having another form of harmonic distortion reducing action and another form of common cathode impedance element is shown in Fig. 7. Pentode tubes 91 and 93 are used for the grounded-grid amplifier and the paraphase amplifier respectively. A triode 95 is used as the common cathode impedance element with the grid connected to a point of positive potential by means of an adjustable potentiometer 96. Adjustment of either or both the rheostat 89 and the potentiometer 96 will stabilize the circuit for line voltage variations.

A filter section comprising a resistor 97 and capacitor 98 mechanically connected for simultaneous variation is interposed between the anode output of the cathode follower 93 and an output power amplifier tube 99. The low-pass-filter action of this arrangement further reduces the harmonic distortion contained in the signal fed to the power amplifier 99.

Distortion and output level control potentiometers are connected in the anode circuits of the paraphase amplifier 93. In this arrangement, output can be taken from either the anode or the cathode of the power amplifier 99. The cathode output is shown adjustable by a potentiometer.

The suppressor elements 101, 102 of the tubes 91 and 93 are shown grounded rather than connected in the more conventional manner to the cathodes. This feature may be very important, especially if tube types are used that have internal shields connected to the suppressor elements and external tube shields are not used.

Figure 8:
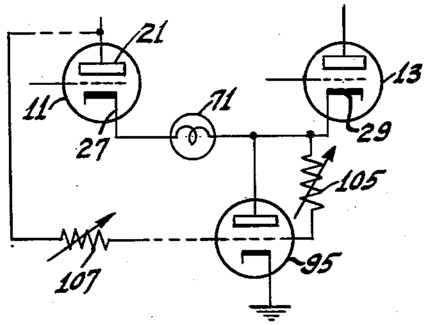
Fig. 8 is a diagram of the invention incorporating additional refinements, which are applicable to a circuit arrangement according to the invention.

Variations of the circuit for obtaining the proper degree of regeneration and stabilization are shown in Fig. 8. The triode variable impedance element 95 may have the characteristic thereof established by means of an adjustable resistance element 105 connected between the grid and the anode. As an alternative or an addition a variable resistance element 107 may be connected between the grid of the tube 95 and the anode 21 of the grounded grid amplifier tube 11 (or the corresponding tube in the other circuit arrangements shown). A tungsten filament lamp 71 connected in the regeneration path between the cathode 27 and the common impedance tube 95 and the cathode 29 may be used to provide additional regulation.

Figure 9:
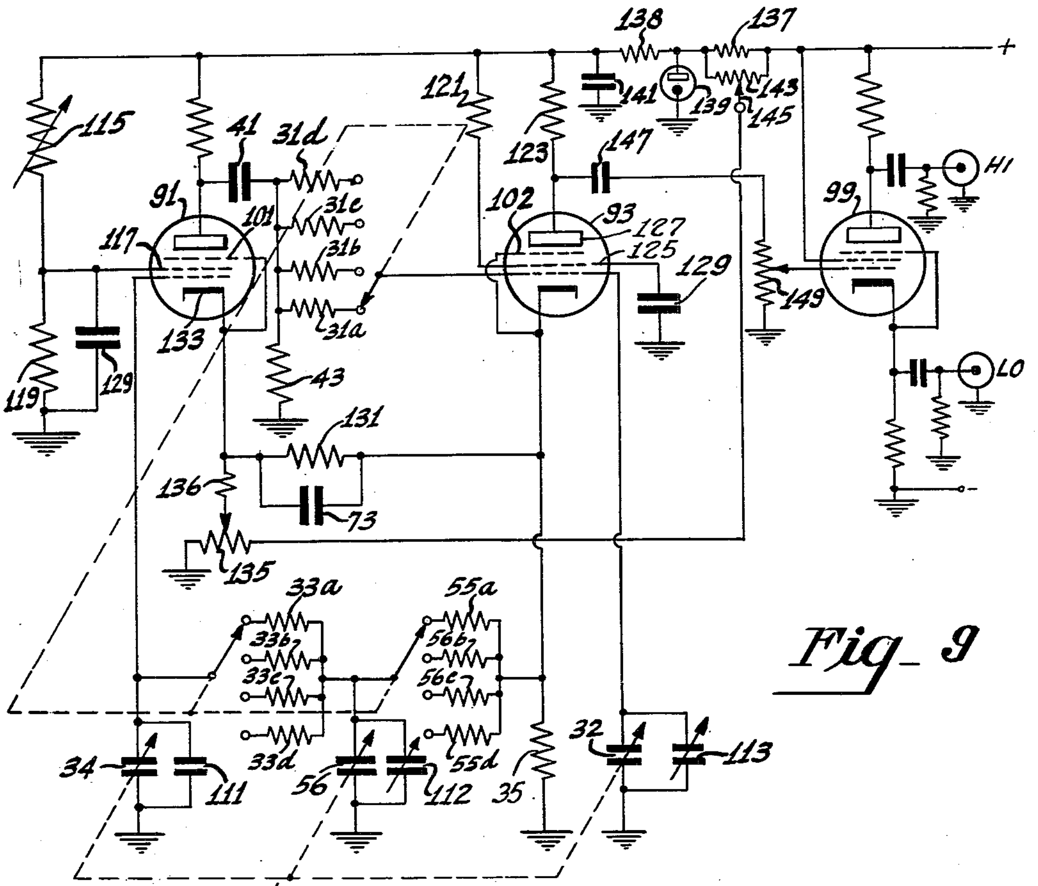
Fig. 9 is a schematic diagram of a test oscillator.

The schematic diagram of a complete test oscillator is shown in Fig. 9. This arrangement combines many, but not all of the features described hereinbefore in connection with the other circuit arrangements, and also incorporates several other advantageous features as well.

The phase shifting networks are used to tune over the desired frequency spectrum in four bands each of 10:1 frequency ratio. This is accomplished by switching resistors 31*a*—31*d* and 55*a*—55*d* to change bands while tuning a three-gang variable capacitor comprising sections 32, 34 and 56 having grounded rotors and frame. Trimmer capacitors 111, 112 and 113 are used to obtain superior tracking with components of the usual commercial tolerance.

The suppressor grids 101 and 102 are connected to the cathodes. A variable resistor 115 is connected between the D. C. potential supply and the screen grid 117 of the grounded grid amplifier tube 91 and a fixed resistor 119 is connected from the screen grid effecting a voltage divider which is adjusted to balance the operation of the two amplifier tubes 91 and 93 to eliminate distortion of the output sine wave. Fixed resistors 121 and 123 are used in the lead to the screen grid 125 and the anode 127 of the paraphase amplifier tube 93. A small bypass capacitor 129 was found desirable at this point to provide flat output into the R. F. range.

For the sake of clarity, all grounds are shown at the most convenient locations in the drawing. In good instrument practice, all oscillator circuit grounds should be made at a single point to eliminate the possibility of hum pickup, especially on the lowest frequency range. No special hum-reducing precautions are necessary other than those employed in regular engineering practice. In one model a halfwave rectifier was used simply because of component availability. The use of a full-wave rectifier, however reduces filtering problems. A voltage regulator tube may be used instead of a filter choke; costs being equal, and the tube will regulate the anode voltage in addition to providing hum filtering.

A fixed resistor 131 is connected between the cathode 133 of the tube 91 and the common cathode resistor 35 to aid in application of the proper bias to the tube 91. Regeneration is controlled by adjusting a potentiometer 135 to vary the amount of bias applied to the tube 91 through a fixed resistor 136. The oscillator circuit is made substantially insensitive to the variations of power line voltage by further adjustment of the bias on the driven amplifier tube 91. A pair of fixed filter resistors 137 and 138 are interposed in the D. C. potential lead betwen the output tube 99 and two amplifier tubes 91 and 93. A voltage regulator tube 139 and a large capacitor 141 complete the filter. A potentiometer 143 is bridged across the first filter. A potentiometer 143 is bridged across the first filter resistor 137 and the arm 145 is connected to the ungrounded end of the regeneration control potentiometer 135.

The end of the potentiometer is made to vary more or less as the line voltage varies by adjustment of the arm 145 of the line balance potentiometer 143. As the arm 145 is moved nearer to the regulator tube 139 the variations with line voltage are reduced and as the arm is moved in the opposite direction the variations are increased, since the D. C. input to the filter varies directly as the line voltage varies while the D. C. voltage at the regulator tube is substantially constant. One position of the arm 145 will be found at which the oscillator circuit output amplitude will not vary with A. C. power line voltage changes.

A fixed resistor 35 is used as the common cathode impedor and found satisfactory for the service to which the oscillator was put. For more exacting service a diode such as hereinbefore described is suggested, and/or a tungsten filament lamp would be used in place of resistor 131.

An output coupling capacitor 147 and amplitude level control potentiometer 149 are connected to the input of the output amplifier tube 99 from which high and low impedance outputs are obtained with the levels set by the one control 149.

Figure 10:
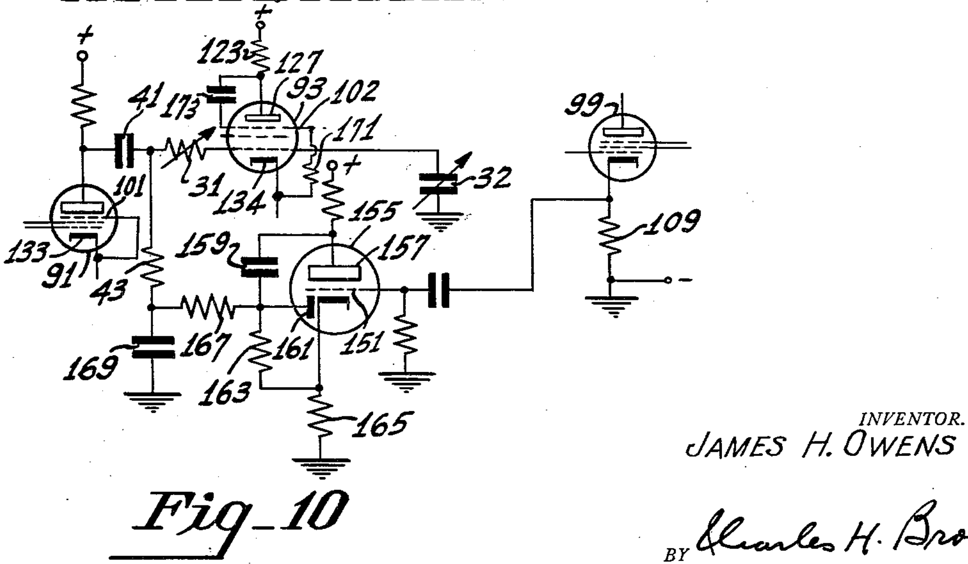
Fig. 10 is a schematic diagram of another output stabilizing circuit applicable to an oscillator circuit arrangement according to the invention.

Referring to Fig. 10, there is shown an arrangement for further stabilizing an oscillator according to the invention. A sampling of the output wave across the cathode resistor 109 of the output amplifier tube 99 is applied to the grid 151 of a diode-triode tube 155. The triode section of this stabilizer tube acts as an audio frequency amplifier. The output at the anode 157 of the triode section is applied by way of a capacitor 159 to the diode element 161 which produces a direct potential across the diode load resistor 163 connected between the diode element 161 and the cathode bias resistor 165. This D. C. potential is filtered by means of a resistor 167 and a capacitor 169 and applied to the low potential end of the grid return resistor 43 to vary the bias on the control grid of the paraphase amplifier tube 93 inversely proportional to the output wave amplitude. By suitable rearrangement of circuit components, the rectified and filtered voltage can be applied as a D. C. bias or A. G. C. to the grounded-grid amplifier, if desired, as well as to the paraphase amplifier.

Another output limiting arrangement is shown in Fig. 10. Instead of connecting the suppressor grid 102 to the cathode 134 as are the connections shown for the suppressor grid 101 and the cathode 133, a high resistance element 171 is used and a capacitor 173 is connected between the suppressor grid 134 and the anode 127. Rectification takes place and a negative voltage is built up on the suppressor grid 134 which tends to reduce the amplitude of the oscillations. If the amplitude of oscillation drops the negative voltage will drop, the gain will increase and the oscillator will recover. Inverse feedback is obtained with the arrangement shown. Regeneration can be obtained without changing the D. C. bias effects by connecting the capacitor between the suppressor grid 134 of the paraphase amplifier 93 and the anode 128 of the driven amplifier 91.

In the arrangement of Fig. 6, the following tubes were used in the construction of an oscillator which had extremely good stability.

| Ref. No.: | Type |
|---|---|
| **51** | 6BH6 |
| **53** | 6AK6 |
| **85** | 6C4 |

No series resistance was necessary in the heater leads with the type 6C4 tube (grid tied to anode).

In the arrangement of Fig. 10 the following components were used in the construction of an oscillator with substantially constant output amplitude regardless of line voltage variation and tube drift.

| Ref. No.: | Type |
|---|---|
| **91** | 6BH6 |
| **93** | 6AK6 |
| **155** | Diodo Triode type |
| **171** | megohms 10 |
| **173** | μfd 0.01 |

The test oscillator shown in Fig. 9 was constructed with the following component values for generating sine waves over the frequency range of 11 cycles/second to 110 kilocycles/second. Obviously other values can be used to tune to other frequencies.

| Ref. No.: | Type |
|---|---|
| **91** | 6BH6 |
| **93** | 6AK6 |
| **99** | 6AQ5 |
| **139** | 0A2 |

| | Value | Type |
|---|---|---|
| Resistors: | | |
| 31*a* | 17 Meghohms | Adjustable. |
| 31*b* | 1.5 Megohms | Do. |
| 31*c* | 200 Kilohms | Do. |
| 31*d* | 15 Megohms | Fixed. |
| 33*a*, 55*a* | 15 Megohms | Do. |
| 33*b*, 55*b* | 1.5 Megohms | Do. |
| 33*c*, 55*c* | 150 Kilohms | Do. |
| 33*d*, 55*d* | 15 Kilohms | Do. |
| 35 | 2.2 Kilohms<br>10 Megohms | Do.<br>Do. |
| 115 | 100 Kilohms | Variable. |
| 119 | 68 Kilohms | Fixed. |
| 121 | 47 Kilohms | Do. |
| 123 | 10 Kilohms | Do. |
| 131 | 900 Ohms | 1%. |
| 135 | 100 Kilohms | Potentiometer. |
| 136 | 39 Kilohms | Fixed. |
| 137 | 5 Kilohms | 5 watt. |
| 138 | 1500 Ohms | Fixed. |
| 143 | 10 Kilohms | Potentiometer. |
| 149 | 100 Kilohms | Do. |
| Capacitors: | | |
| 32, 34, 56 | 15–500 μμf | Ganged variable. |
| 41 | 0.1 μf | Tubular. |
| 73 | 680 μμf | Ceramic. |
| 111, 112, 113 | 8–35 μμf | Adjustable. |
| 129 | 20 μμf | Ceramic. |
| 141 | 80 μf | Electrolytic. |

The invention claimed is:

1. A generating circuit arrangement for producing oscillations of substantially constant frequency and amplitude, including two controlled electron flow path devices each having electron emitting, electron flow controlling and electron collecting electrodes, an electric low pass filter comprising a resistor having one terminal coupled to the electron collecting electrode of one of said devices and another terminal connected to the electron flow controlling electrode of the other of said devices and a capacitor connected between the electron flow controlling electrode of said other device and a point of reference potential, a common impedance element having one terminal connected to both of said electron emitting electrodes and having another terminal connected to said point of reference potential, and another electric low pass filter comprising a resistor connected for direct current flow between said one terminal of said common impedance element and the electron flow controlling electrode of said one device and a capacitor connected by substantially low impedance means between said electron flow controlling electrode of said one device and said point of reference potential.

2. A generating circuit arrangement as defined in claim 1 and wherein said common impedance element has an impedance-current characteristic whereby the impedance value decreases with an increase of current flowing through said common impedance element.

3. A generating circuit arrangement as defined in claim 2 and wherein said common impedance element is constituted by a controlled electron flow path device having an electron emitting electrode connected to said point of reference potential and an electron collecting electrode connected to said electron emitting electrodes.

4. A generating circuit arrangement as defined in claim 1 and wherein said other controlled electron flow path device incorporates a screen electrode interposed between the electron flow controlling and the electron collecting electrodes, and means connecting said screen electrode for direct current flow to the electron collecting electrode of said one controlled electron flow path device.

5. An oscillation generating circuit arrangement including a pair of controlled electron discharge devices having cathode, control and anode electrodes, a resistance element coupled between the anode electrode of one of said devices and the control electrode of the other, another resistance element coupled between the control electrode of the other of said devices and the cathode electrode of said one device, capacitive reactance elements connected in series between the control electrodes of said devices, and a common impedance element coupled to the cathode electrodes of both of said devices and to the junction between said series connected capacitive reactance elements, said common impedance element having a negative non-linear impedance-to-current characteristic wherein the impedance decreases with an increase of current therethrough.

6. An oscillation generating circuit arrangement as defined in claim 5 and wherein said common impedance element is constituted by a three-halves-law diode electron flow device.

7. An oscillation generating circuit arrangement as defined in claim 5 and wherein said common impedance element is constituted by a triode electron discharge device having a square-law operating characteristic.

8. An oscillation generating circuit arrangement as defined in claim 5 and wherein said common impedance element is constituted by a space-charge-limited electron discharge device.

9. An oscillation generating circuit arrangement as defined in claim 5 and wherein said common impedance element is constituted by an electron flow device having two dissimilar electrodes.

10. An oscillation generating circuit arrangement as defined in claim 5 and wherein said common impedance element is constituted by a thermionic device.

11. An oscillation generating circuit arrangement as defined in claim 5 and wherein said common impedance element is constituted by an impedance element wherein the impedance decreases with an increase in temperature.

12. In an oscillator circuit arrangement as defined in claim 1 including a source of direct energizing current for at least one of said electron discharge devices and having a given undesired variation therein, means to prevent said given undesired variation from affecting the output wave of said oscillator circuit arrangement comprising a filter impedance element connected in series with the anode-cathode path of said one electron discharge device and through which said operating current passes, a voltage regulator device connected between the junction of said filter impedance element and a point of fixed reference potential to establish substantially constant voltage at said junction, a potentiometer connected across said filter impedance element and having an arm, resistive connections between said cathode and said grid normally biasing said grid with respect to said cathode, and a connection between said arm and said resistive connections to introduce said variation between said grid and said cathode in a sense opposing the variations in anode-cathode current due to said given undesired variation.

13. In an oscillator circuit arrangement as defined in claim 1 including a source of direct energizing current for at least one of said electron discharge devices and having a given undesired variation therein, means to prevent said given undesired variation from affecting the output wave of said oscillator circuit arrangement comprising a filter impedance element connected in series with the anode-cathode path of said one electron discharge device and through which said operating current passes, means connected between the junction of said filter impedance element and a point of fixed reference potential to establish substantially constant voltage at said junction, a voltage dividing arrangement connected across said filter impedance element and having tap connections between said cathode and said grid normally biasing said grid with respect to said cathode, and a connection between said tap and said connections to introduce said variation between said grid and said cathode in a sense opposing the variations in anode-cathode current due to said given undesired variation.

14. An oscillation generator as defined in claim 16 and incorporating means for maintaining the amplitude of oscillations constant, comprising a capacitor connected between the anode and suppressor electrodes and a resistor interposed in the connection between the cathode and suppressor electrodes in at least one of the electron discharge devices employed.

15. An oscillation generator as defined in claim 1 and incorporating, means for maintaining the amplitude of oscillations constant, comprising a positive temperature coefficient resistive element in the positive feedback path connecting the cathodes of the two electron discharge devices.

16. An oscillation generating circuit arrangement including, a pair of electron discharge devices each having cathode, control, screen suppressor and anode electrodes, an impedance element having one terminal connected in common to the cathode electrodes of both of said devices and having another terminal connected to a point of reference potential, connections between the suppressor and cathode electrodes of each of the respective devices, means connecting said screen and anode electrodes to a point of direct energizing potential positive with respect to said reference potential, a pair of resistance components one of which is coupled between the anode electrode of one of said electron discharge devices and the control electrode of the other and the other of which resistance components is connected for direct current flow between said one terminal of said common impedance element and the control electrode of said one electron discharge device, and a pair of capacitance components having terminals connected in common to said point of reference potential and having other terminals connected individually by substantially low impedance means to the control electrodes of said electron discharge devices, and means for simultaneously adjusting at least one of said pairs of components to vary the frequency of oscillations generated.

17. An oscillation generating circuit arrangement as defined in claim 16, and incorporating a resistance element interposed between said one terminal of said common impedance element and said resistance component connected to the control electrode of said one electron discharge device, an electron discharge structure comprising a diode member, an anode member, a cathode member in common with said diode and anode members, and a grid member associated only with said cathode and anode members, means coupling said grid member to the anode electrode of said other electron discharge device, means coupling said anode member to a point on said resistance element and said diode member, and further means connecting said cathode member to said one terminal of said common impedance element.

18. An oscillation generating circuit arrangement as defined in claim 16, and incorporating an electron discharge structure having cathode, control and anode electrodes, a resistance component connected between the anode electrode of one of said electron discharge devices and the control electrode of said electron discharge structure, a capacitance component connected by substantially low impedance means between the control electrode of said electron discharge structure and said point of reference potential, means connected between said point of reference potential and a point on the cathode-anode current path of said electron discharge structure to derive the generated oscillations, and means mechanically coupling at least one of said components corresponding to said coupled pairs of components for simultaneous adjustment therewith.

References Cited in the file of this patent

UNITED STATES PATENTS

| | | |
|---|---|---|
| 2,441,567 | Darlington | May 18, 1948 |
| 2,577,235 | Davidson | Dec. 4, 1951 |

FOREIGN PATENTS

| | | |
|---|---|---|
| 253,342 | Switzerland | Nov. 1, 1948 |

OTHER REFERENCES

"Lock-In R. C. Oscillator," by W. C. Elmore and D. Bancroft in Review of Scientific Instruments, vol. 20, No. 2, February 1949.